UNITED STATES PATENT OFFICE.

RALPH W. KING, OF THE DALLES, OREGON, ASSIGNOR TO PACIFIC EVAPORATOR COMPANY, OF PORTLAND, OREGON, A CORPORATION OF OREGON.

METHOD OF PREPARING EVAPORATED VEGETABLES.

1,259,631.

Specification of Letters Patent. Patented Mar. 19, 1918.

No Drawing. Application filed June 27, 1916. Serial No. 106,147.

*To all whom it may concern:*

Be it known that I, RALPH W. KING, a citizen of the United States, residing at The Dalles, in the county of Wasco and State of Oregon, have invented new and useful Improvements in Methods of Preparing Evaporated Vegetables, of which the following is a specification.

This invention relates to a method of preparing evaporated potatoes and consists in certain improvements therein as will be hereinafter fully described and pointed out in the claims.

In its broader phases the invention relates to the preparation of evaporated vegetables considering the term "vegetable" as inclusive of food products of a vegetable nature, such for instance, as is commonly termed fruit. More specifically the invention is designed for the preparation of potatoes.

The effort made in evaporating vegetables is to give to the vegetable when prepared for use as nearly as possible its natural quality. The appearance is important as well as the taste.

Carrying out my invention and considering it specifically in relation to potatoes, these are peeled by any of the well-known methods. The peeled potatoes are then subjected to a salt solution. The salt solution ordinarily used is common table salt, or sodium chlorid. I have found that an approximately three per cent. solution gives the best results.

After subjecting the potatoes to this solution the potatoes are sliced, preferably being one-fourth of an inch in thickness. The potatoes are then again subjected to a salt solution, the same percentage.

The potatoes are then subjected to a steaming process and in the ordinary commercial practice the potatoes when sliced will be placed on trays on which they are finally dried. The potatoes are carried by the trays, subjected to the salt solution and then still remaining on the trays placed in a receptacle and subjected to a steaming process. Dry steam should be used and the process continued for a very short time, ordinarily about seven minutes, the temperature in the material being kept below the point which will break down the cells, or in other words, the temperature must not be carried to such an extent as to affect the cooking of the vegetables. For potatoes this should only be sufficient to set the starch. After the steaming process the potatoes are still carried by the trays and run through the evaporator and the moisture extracted from the sliced potatoes. Preferably this is accomplished by using air with atmospheric humidity as this assures a uniform drying and the temperature in the evaporator is preferably carried below 156° Fahrenheit, thus preventing any breaking down of the cells due to the heat in the evaporator. By thus keeping the temperature in the material below the point breaking down the cells or 156° F., the point of cooking throughout the process, the material retains a cell structure capable of assuming very nearly its original position when moisture is again applied.

Both the salt solution and the steaming tend to prevent the discoloration of the potato. While either seems to have this effect in some measure the combined process seems to get a more uniform and better result. Vegetables and particularly potatoes subjected to the process herein described retain very closely their original color and quality when again subjected to moisture.

What I claim as new is:—

1. The method of preparing evaporated vegetables which consists in subjecting the same to a solution of common salt to prevent discoloration, and evaporating through the action of air at atmospheric humidity the moisture from the vegetable so treated, the vegetable during the process being maintained below a temperature breaking down its cells by cooking.

2. The method of preparing evaporated vegetables which consists in subjecting the same to a three per cent. salt solution and then evaporating the moisture from the vegetables so treated.

3. The method of preparing evaporated potatoes which consists in subjecting the same to a solution of common salt to prevent discoloration, and evaporating through the action of air at atmospheric humidity the moisture from the potatoes so treated, the potatoes during the process being maintained below a temperature breaking down its cells by cooking.

4. The method of preparing evaporated vegetables which consists in subjecting the same to the action of steam and evaporating the moisture therefrom through the action of air at atmospheric humidity while maintaining the temperature in the vegetable during the process below a point breaking down the cells of the vegetable by cooking.

5. The method of preparing evaporated vegetables which consists in subjecting the same to a salt solution; slicing the vegetables; subjecting the sliced vegetables to a salt solution; and evaporating the moisture from the vegetables so treated.

6. The method of preparing evaporated vegetables which consists in subjecting the same to a salt solution; slicing the vegetables so treated; subjecting the sliced vegetables to a salt solution; and evaporating the moisture from the vegetables so treated.

7. The method of preparing evaporated vegetables which consists in subjecting the the same to the action of steam, maintaining the temperature below a point breaking down the cells of the vegetables; and evaporating the moisture from the vegetables so treated.

8. The method of preparing evaporated potatoes which consists in subjecting the same to the action of steam, maintaining the temperature at a point only sufficient to set the starch and below a point breaking down the cells; and evaporating the moisture from the potatoes so treated.

9. The method of preparing evaporated vegetables which consists in subjecting the same to a salt solution; subjecting the vegetables so treated to the action of steam; and evaporating the moisture from the vegetables so treated.

10. The method of preparing evaporated vegetables which consists in subjecting the same to a salt solution; slicing the vegetables; subjecting the sliced vegetables to a salt solution; subjecting the vegetables so treated to the action of steam; and evaporating the moisture from the vegetables so treated.

11. The method of preparing evaporated vegetables which consists in subjecting the same to a salt solution; and then evaporating the moisture therefrom by a current of air maintaining the temperature during the evaporation approximating or below 156° Fahrenheit.

12. The method of preparing evaporated vegetables which consists in subjecting the same to the action of steam, maintaining the temperature below a point which will break down the cells of the vegetables or at which cooking takes place; and evaporating the moisture from the vegetables so treated; maintaining the temperature during the evaporation approximating or below 156° Fahrenheit.

13. The method of preparing evaporated vegetables which consists in subjecting the same to a salt solution; subjecting the vegetables so treated to the action of steam; and evaporating the moisture from the vegetables so treated, maintaining the temperature during evaporation at a point approximating or below 156° Fahrenheit.

14. The method of preparing evaporated potatoes which consists in subjecting the same to a salt solution; then subjecting the potatoes so treated to the action of steam for a period and at a temperature to prevent cooking; and then evaporating the moisture from the potatoes so treated, maintaining the temperature during evaporation at a point approximating or below 156° Fahrenheit.

15. The method of preparing evaporated vegetables which consists in subjecting the same to a common salt solution and to the action of steam and evaporating through the action of air at atmospheric humidity the moisture from the vegetables so treated.

16. The method of preparing evaporated vegetables which consists in subjecting the same to a common salt solution and to the action of steam and evaporating through the action of air at atmospheric humidity the moisture from the vegetables so treated while maintaining the temperature during the process below a point breaking down the cells by cooking.

17. The method of preparing evaporated vegetables which consists in subjecting the same to a color-preserving solution, steaming the vegetable, and evaporating the moisture therefrom by the action of air, the temperature in the vegetable during the process being maintained below the point breaking down the cells by cooking.

18. The method of preparing evaporated vegetables which consists in subjecting the same to a color-preserving solution, steaming the vegetable, and evaporating the moisture therefrom by the action of air at atmospheric humidity, the temperature in the vegetable during the process being maintained below the point breaking down the cells by cooking.

In testimony whereof I have hereunto set my hand.

RALPH W. KING.